United States Patent [19]

Kumagai et al.

[11] Patent Number: 5,392,156
[45] Date of Patent: Feb. 21, 1995

[54] OPTICAL DEVICE

[75] Inventors: Hiroaki Kumagai; Nagato Osano, both of Kawasaki; Naoki Kobayashi, Tokyo, all of Japan

[73] Assignee: Canon Kabushiki Kaisha, Tokyo, Japan

[21] Appl. No.: 35,063

[22] Filed: Mar. 22, 1993

[30] Foreign Application Priority Data

Mar. 31, 1992 [JP] Japan .................. 4-077446

[51] Int. Cl.⁶ .................. G02B 1/10; G02B 5/28
[52] U.S. Cl. .................. 359/586; 359/577; 359/578; 359/579; 359/580; 428/216
[58] Field of Search ............. 359/586, 577, 578, 579, 359/580; 428/216

[56] References Cited

U.S. PATENT DOCUMENTS

| | | | |
|---|---|---|---|
| 4,759,990 | 7/1988 | Yen ................... | 359/580 |
| 5,002,832 | 3/1991 | Osano ................ | 428/474.4 |
| 5,170,290 | 12/1992 | Szcyrbowski et al. ... | 359/586 |

FOREIGN PATENT DOCUMENTS

| | | | |
|---|---|---|---|
| 0119331 | 9/1984 | European Pat. Off. ..... | G02B 1/10 |
| 0224985 | 11/1985 | European Pat. Off. ..... | G02B 1/10 |
| 2036604 | 2/1987 | Japan ................... | 359/586 |
| 3139302 | 6/1988 | Japan ................... | 359/586 |
| 3051802 | 3/1991 | Japan ................... | 359/586 |

OTHER PUBLICATIONS

Cox et al., Two-Layer Anti-Reflection Coatings for Glass in the Near Infra-Red, 1957, Vacuum vol. IV No. 4, pp. 445–455.
Patent Abtracts of Japan, vol. 13, No. 30 (P-816), Jan. 24, 1989 & JP-A-63 228 101 (Nippon Sheet Glass), Sep. 22, 1988.
Patent Abstracts of Japan, vl. 9, No. 58 (P-341), Mar. 14, 1985 & JP-A-59 195 203 (Matsushita Denki Sangyo), Nov. 6, 1984.
Database WPI, Week 9304, Derwent Publications Ltd., AN 93-029961 & JP-A-4 355 401 (Mitsubishi Rayon, Dec. 9, 1992.
Database WPI, Week 8944, Derwent Publications Ltd., AN 89-320802 & JP-A-1 239 191 (Goyo Shiko), Sep. 25, 1989.
Database WPI, Week 9030, Derwent Publications Ltd., AN 90-229436 & JP-A-2 159 281 (Terumo Corp.), Jun. 19, 1990.

Primary Examiner—Eugene R. LaRoche
Assistant Examiner—Huan Hoang
Attorney, Agent, or Firm—Fitzpatrick, Cella, Harper & Scinto

[57] ABSTRACT

An optical device is composed of: a transparent base plate formed of a glass or a macromolecular resin; a first layer formed of a substance having a refractive index of 1.58 or higher; and a second layer formed of an amorphous transparent fluorocarbon resin having a refractive index of 1.35 or lower. The second layer is farther from the transparent base plate than the first layer from the transparent base plate. The first and second layer constitute a film for preventing reflection. Optionally, adhesive layers are provided between the transparent base plate and the first layer and between the first layer and the second layer. Further optionally, the surfaces of the transparent base plate and the first layer are treated in order to enhance adhesion between the contact surfaces.

20 Claims, 4 Drawing Sheets

OPTICAL DEVICE

BACKGROUND OF THE INVENTION

1. Field of the Invention

The present invention relates to an optical device having a reflection preventing film, such as a lens or a filter.

2. Description of the Related Art

A known reflection preventing film of an optical device, such as a lens, which requires reflection prevention is a multi-layer film formed by alternately laminating a highly refractive substance, such as $TiO_2$ or $ZrO_2$, and a low-refractive substance, such as $MgF_2$, by a vacuum vapor deposition method or a liquid applying method. The layer arranged close to the air must be formed of a substance having as low a refractive index as possible. According to the conventional art, this layer is formed of $MgF_2$, which has an $nd=1.38$ (nd being a refractive index with respect to 587 nm ray). Although crystalline fluorocarbon resins have lower refractive indexes than $MgF_2$; for example, polytetrafluoroethylene has an $nd=1.35$, they have poor formability and very low solubilities in general organic solvents. Therefore, according to the conventional art, crystalline fluorocarbon resins has not been used to form thin films such as reflection preventing films.

SUMMARY OF THE INVENTION

An object of the present invention is to provide an optical device that has a reflection preventing film in which a layer close to the air has a lower refractive index than a $MgF_2$ layer employed according to the conventional art, so as to achieve excellent reflection preventing characteristics.

Another object of the present invention is to provide an optical device having a reflection preventing film which is formed by applying liquids containing the coating materials by a suitable method, for example, the dip coating method or the spin coating method.

Still another object of the present invention is to provide an optical device which has excellent characteristics for adhesion between the reflection preventing film and a transparent base plate.

Accordingly, the present invention provides an optical device comprising: a transparent base plate; a first layer formed of a substance having a refractive index of 1.58 or higher; and a second layer which is farther from the transparent base plate than the first layer from the transparent base plate and formed of an amorphous transparent fluorocarbon resin having a refractive index of 1.35 or lower, the first layer and the second layer serving as a film for preventing reflection.

An optical device according to the present invention achieves excellent reflection preventing characteristics because the second layer arranged closer to the air is formed of a transparent amorphous fluorocarbon resin which has a refractive index ($nd \leq 1.35$) lower than the refractive index of $MgF_2$, a high solubility in an organic solvent, and a high transmission characteristic with respect to visible rays and near infrared rays.

Further, because the amorphous transparent fluorocarbon resin is soluble in organic solvents, the reflection preventing film can be formed by a liquid application method, such as dip coating or spin coating.

Further, the present invention provides an optical device having a reflection preventing film, in which the adhesion between the contact surfaces is enhanced by providing an adhesive layer between the contact surfaces or by treating the surface of the transparent base plate made of a glass or a macromolecular resin and/or the surface the first layer made of a substance having a high refractive index ($nd \geq 1.58$) with, for example, corona discharge, plasma, or ozone formed by ultraviolet irradiation.

Further objects, features and advantages of the present invention will become apparent from the following description of the preferred embodiments with reference to the attached drawings.

DETAILED DESCRIPTION OF THE PREFERRED EMBODIMENTS

An optical device according to the present invention comprises: a transparent base plate formed of glass or a macromolecular resin; a first layer formed of a substance having a refractive index of 1.58 or higher; and a second layer which is farther from the transparent base plate than the first layer is from the transparent base plate and which is formed of an amorphous transparent fluorocarbon resin having a refractive index of 1.35 or lower, the first layer and the second layer constituting a film for preventing reflection.

Preferably, the first layer should have an optical thickness $n_1 d_1$ which satisfies either one of the following inequalities:

$$0.8 \times k\lambda_1/2 \leq n_1 d_1 \leq 1.2 \times k\lambda_1/2$$

or $$0.8 \times k\lambda_1/4 \leq n_1 d_1 \leq 1.2 \times k\lambda_1/4$$

and the second layer should have an optical thickness $n_2 d_2$ which satisfies the following inequality:

$$0.8 \times L\lambda_2/4 \leq n_2 d_2 \leq 1.2 \times L\lambda_2/4$$

where k and L are positive odd numbers; $n_1$ and $n_2$ are the refractive indexes of the first and second layers, respectively; $d_1$ and $d_2$ are the thickness of the first and second layers, respectively; and $\lambda_1$ and $\lambda_2$ are the designed wavelengths of the first and second layers, respectively, which are exactly or approximately the same and selected from a wavelength range of 400–900 nm. If the designed wavelengths $\lambda_1$ and $\lambda_2$ are not exactly the same, the difference therebetween should preferably be $\lambda_1 = \lambda_2 \pm 10$ nm and, more preferably, $\lambda_1 = \lambda_2 \pm 5$ nm.

Figure 1:
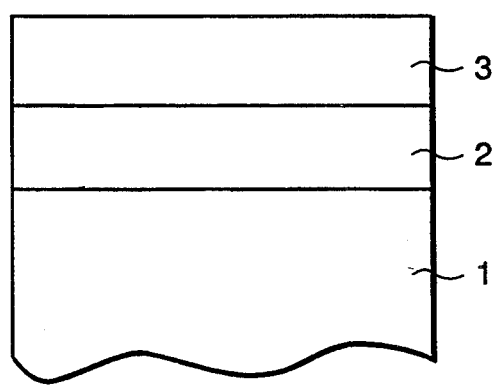
FIG. 1 is a sectional view of an optical device having a reflection preventing film according to the present invention.

As shown in FIG. 1, an optical device according to a preferred embodiment comprises: a transparent base plate 1; a first layer 2 formed thereon; and a second layer 3 formed on top of the first layer 2. The first and second layers 2, 3 constitute a reflection preventing film.

Figure 2:
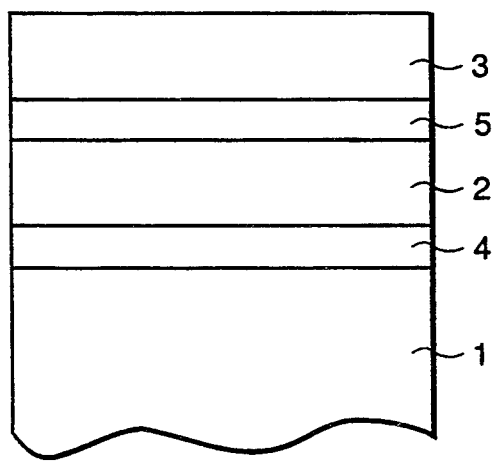
FIG. 2 is a sectional view of an optical device having a reflection preventing film including adhesive layers according to the present invention.

An optical device according to another preferred embodiment as shown in FIG. 2 further comprises: an adhesive layer 4 provided between the transparent base plate 1 and the first layer 2; and another adhesive layer 5 provided between the first layer 2 and the second layer 3.

The first and second layers 2, 3 should preferably be formed by applying to the transparent base plate 3, the coating formulations obtained by dispersing or dissolving the respective materials for these layers in organic solvents.

Examples of the material for the transparent base plate 1 according to the present invention are: glasses, such as optical glass used to form lenses or the like, and quartz glass used to form filters or the like; and macromolecular resins, such as polymethylmethacrylate, polystyrene, polycarbonate, polyolefin, and copolymers of any two or more of the foregoing polymers.

The highly refractive material used to form the first layer 2 has an nd=1.58 or higher (nd being a refractive index with respect to the d ray (587 nm) of Na). The refractive index of the first layer 2 should preferably be higher than that of the transparent base plate 1. This highly refractive material may be an inorganic or organic substance.

Examples of the inorganic highly refractive material used to form the first layer 2 are oxides of metals such as titanium Ti, cerium Ce, zirconium Zr, tin Sn, antimony Sb and tantalum Ta. The first layer 1 is formed by applying a coating liquid containing such a metal oxide to the transparent base plate 1 according to the dip coating method or the spin coating method and then heating the applied coating liquid. The coating liquid is obtained by dispersing particles of the metal oxide having particle sizes of 1–100 nm in an organic solvent together with a binding agent, such as tetraalkoxysilane, and a fine-particle stabilizing agent.

Examples of the organic highly refractive material for the first layer 2 are macromolecular polymers, such as polystyrene, polycarbonate, polystyrene derivatives; polycarbonate derivatives, and polymethylmethacrylate derivatives. These derivatives contain sulfur atoms, halogen atoms or polycyclic aromatic hydrocarbons chemically bound to or mechanically trapped in polystyrene, polycarbonate or polymethylmethacrylate. The first layer 2 is formed by applying a coating liquid containing such a macromolecular resin to the transparent base plate 1 according to the dip coating method and then heat-drying the applied coating liquid. The coating liquid is obtained by dissolving the macromolecular resin in an organic solvent. Examples of the organic solvent are: aromatic hydrocarbons such as toluene; esters such as isobutyl acetate; alcohols such as isopropyl alcohol; ketones such as methyl ethyl ketone; ethers such as diisopropyl ether; and mixtures of any of the foregoing solvents.

The concentration, viscosity, etc. of the coating liquid including an organic solvent and either a fine-particle metal oxide or a macromolecular resin vary depending on a desired thickness of the resultant film. However, a coating liquid having a viscosity within the range of 1–15 cps (20° C.) is the most preferable because such a coating liquid significantly reduces fluctuation of the film, e.g., inconsistency in thickness, when applied by the dip coating method or the spin coating method.

The amorphous structure of the amorphous transparent fluorocarbon resin used to form the second layer 3 can be verified by formation of a transparent film. Also, the amorphous structure can be determined by the X ray crystal analysis. If an amorphous structure is achieved, no crystal is observed by this analysis.

Examples of the preferred amorphous transparent fluorocarbon resin soluble in an organic solvent are polymers whose main chains have repetition of either one unit of the following repetition units:

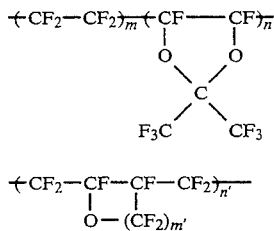

wherein m, m', n and n' are positive integers, and wherein at least one of the fluorine atoms is substituted by at least one selected from the following: amino groups; aldehyde groups; carboxyl groups; alcohol groups; silanol group; phosphonyl group; sulfonyl group; cyano group; nitro group; vinyl group; epoxy group; and fluorine compounds, such as perfluoroalkyls, perfluoroalkyl ethers and perfluoroalkenes, having functional groups at the terminals. Further, the preferred amorphous transparent fluorocarbon resin may be a copolymers comprising any of the above-described repetition units and a repetition unit represented by either one of the above formulas having none of the fluorine atoms substituted. Examples of the above-mentioned functional groups bound to the terminals of the fluorine compounds are: amino group, aldehyde group, carboxyl group, alcohol group, silanol group, phosphonyl group, sulfonyl group, cyano group, nitro group, vinyl group, and epoxy group.

The above-mentioned amorphous transparent fluorocarbon resin is soluble in various solvents, for example: aromatic hydrocarbons such as toluene; ketones such as methyl ethyl ketone; esters such as isobutyl acetate; ethers such as diisobutyl ether; alcohols such as isopropyl alcohol; mixtures of any of the foregoing solvents; and fluorine carbide solvents such as tetradecafluorohexane and octadecafluorooctane. Particularly, such fluorine carbide solvents are suitable for forming a film of the amorphous transparent fluorocarbon resin by the dip coating method or the spin coating method because they easily dissolve an amorphous transparent fluorocarbon resin and do not corrode the highly refractive macromolecular resin used to form the first layer 2.

The concentration, viscosity, etc. of the solution of an amorphous transparent resin vary depending on a desired thickness of the resultant film. However, the solution of an amorphous transparent resin should preferably have a viscosity of 1–15 cps (20° C.) in order to substantially prevent fluctuations of the film, such as an inconsistency in thickness.

In order to enhance the adhesion between the transparent base plate 1 made of glass or a macromolecular resin and the first layer 2 made of a highly refractive metal oxide or macromolecular resin and/or between the first layer 2 and the second layer 3 made of a low-refractive amorphous transparent fluorocarbon resin, the surfaces of the transparent base plate 1 and the first layer 2 may be treated by a surface modification technique, such as plasma treatment, corona discharge treatment, or UV-ozone treatment which activates surfaces by using ozone formed by ultraviolet irradiation. This surface treatment can also be performed effectively by irradiation of the surfaces with electron beams or ion beams.

Further, adhesive layers may be provided between the transparent base plate 1 made of a glass or a macromolecular resin and the first layer 2 made of a highly refractive metal oxide or macromolecular resin and between the first layer 2 and the second layer 3 made of a low-refractive amorphous transparent fluorocarbon resin. Example of the adhesive used to form the adhesive layers are: silane coupling agents having reactive functional groups, such as N-$\beta$(aminoethyl)$\gamma$-aminopropyltrimethoxysilane, N-$\beta$(aminoethyl)$\gamma$-aminopropylmethyldimethoxysilane, $\gamma$-aminopropyltriethoxysilane, N-phenyl-$\gamma$-aminopropyltrimethoxysilane, $\beta$(3,4-epoxycyclohexyl)ethyltrimethoxysilane, $\gamma$-glycidoxypropyltrimethoxysilane, $\gamma$-glycidoxypropylmethyldimethoxysilane, $\gamma$-(methacryloxypropyl)trimethoxysilane; titanate coupling agents, such as isopropyltrioctanoyl titanate, tetra (2,2-diallyloxymethyl-1-butyl) bis(ditridecyl)phosphite titanate, dicumyl phenyloxy acetate titanate, and diisostearoylethylene titanate; zircoaluminate coupling agent represented by the following general formula:

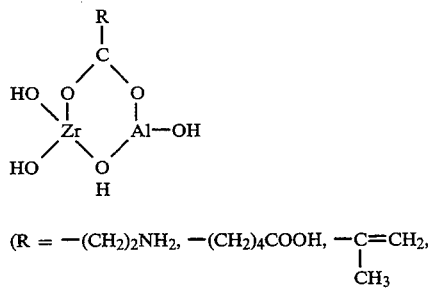

$(R = -(CH_2)_2NH_2, -(CH_2)_4COOH, -\underset{\underset{CH_3}{|}}{C}=CH_2,$ $-(CH_2)_2SH)$ ; and methacrylate monomers, such as isobutylmethacrylate, glycidylmethacrylate, polypropylglycolmethacrylate and glycerolmonomethacrylate.

Examples of the suitable method for enhancing the adhesion between the transparent base plate 1 and the first layer 2 and/or between the first layer 2 and the second layer 3 are:
1. A method in which adhesive layers are provided between the transparent base plate 1 and the first layer 2 and/or between the first layer 1 and the second layer 3.
2. A method in which the UV-ozone treatment is performed to the surface of the transparent base plate 1 before being coated with the first layer 2 and/or to the surface of the first layer 2 before being coated with the second layer 3.
3. A method in which the corona-discharge treatment is performed to the surface of the transparent base plate 1 before being coated with the first layer 2 and/or to the surface of the first layer 2 before being coated with the second layer 3.
4. A method in which the plasma treatment is performed to the surface of the transparent base plate 1 before being coated with the first layer 2 and/or to the surface of the first layer 2 before being coated with the second layer 3.
5. A method in which the UV-ozone treatment is performed to the surface of the transparent base plate 1 and/or to the surface of the first layer 2, and adhesive layers are provided between the transparent base plate 1 and the first layer 2 and/or between the first layer 1 and the second layer 3.
6. A method in which the corona-discharge treatment is performed to the surface of the transparent base plate 1 and/or to the surface of the first layer 2, and adhesive layers are provided between the transparent base plate 1 and the first layer 2 and/or between the first layer 1 and the second layer 3.
7. A method in which the plasma treatment is performed to the surface of the transparent base plate 1 and/or to the surface of the first layer 2, and adhesive layers are provided between the transparent base plate 1 and the first layer 2 and/or between the first layer 1 and the second layer 3.

Using the dip coating method, a reflection preventing film can be formed on each of the two side surfaces of the transparent base plate 1. Using the spin coating method, a reflection preventing film can be formed on only one of the two side surfaces of the transparent base plate 1.

EXAMPLE 1

A thoroughly washed glass base plate (BK7, nd=1.517, 76×24×1 mm) was dipped in an ethanol solution containing 1 wt % N-$\beta$(aminoethyl)$\gamma$-aminopropyltrimethoxysilane for 30 minutes and then drawn up from the solution at a rate of 60 mm/min. After drying at 80° C. for 30 minutes, the glass plate was washed with ethanol and then dried, followed by a surface treatment with a silane coupling agent. The glass base plate treated with the silane coupling agent was dipped in a toluene solution containing 3 wt. % polystyrene (nd=1.592, STYRON ® G8259, ASAHI CHEMICAL INDUSTRY CO., LTD.) for 2 minutes and then drawn up from the solution at a rate of 90 mm/min, followed by drying it at 150° C. for 30 minutes. Thus, first layers were formed, each having a thickness of 166 nm and a K value of 1. The base plate having the first layer was dipped in a 1 wt. % $\gamma$-aminopropyltrimethoxysilane ethanol-solution for 30 minutes and then drawn up from the solution at a rate of 60 mm/min, followed by drying at 80° C. for 30 minutes and washing it with ethanol. Subsequently, the plate was dipped for 2 minutes in an octadecafluorooctane solution containing 2 wt. % fluorocarbon resin (nd=1.338 CYTOP-CTX ®, ASAHI GLASS COMPANY LIMITED) having the following repetition units:

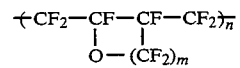

(n, m are positive integers)

and then drawn up from the solution at a rate of 80 mm/min, followed by drying it at 150° C. for 60 minutes. Thus, second layers were formed, each having a thickness of 99 nm and an L value of 1.

Figure 3:
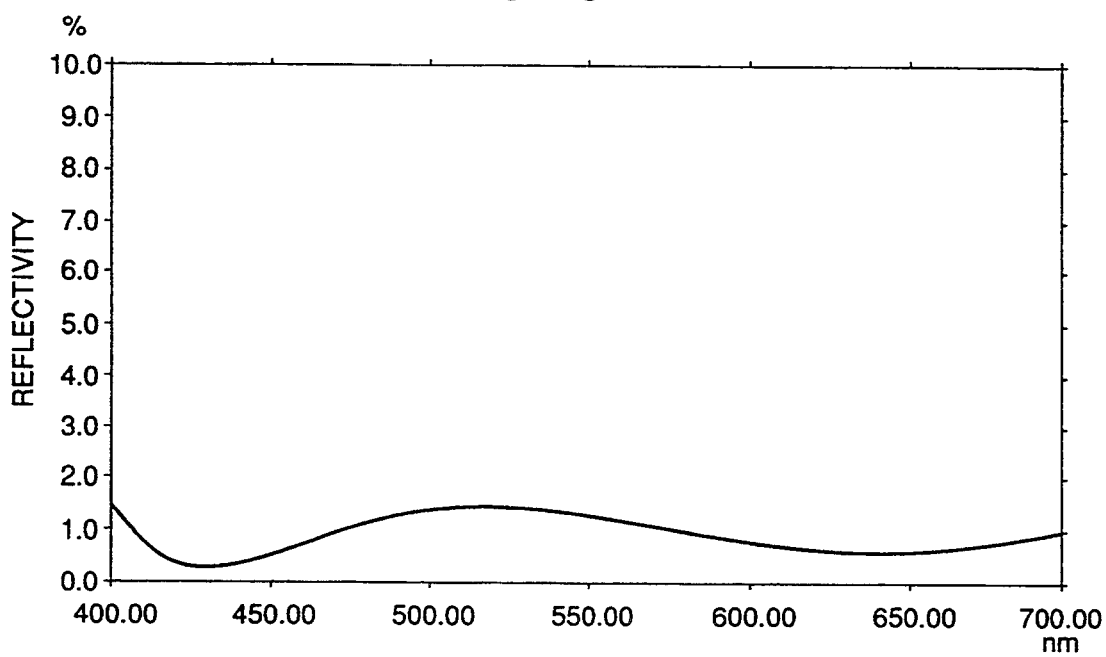
FIG. 3 is a graph indicating the reflectivity of the optical device of Example 1 of the present invention.

The thus-formed optical device composed of the glass base plate and reflection preventing films formed thereon exhibited the following spectroscopic characteristics: reflectivity of 1.5% or lower, and transmittance of 98% or higher, in a visible region of 400–700 nm. The result of this spectroscopic analysis is shown in FIG. 3.

Comparative Example

Figure 4:
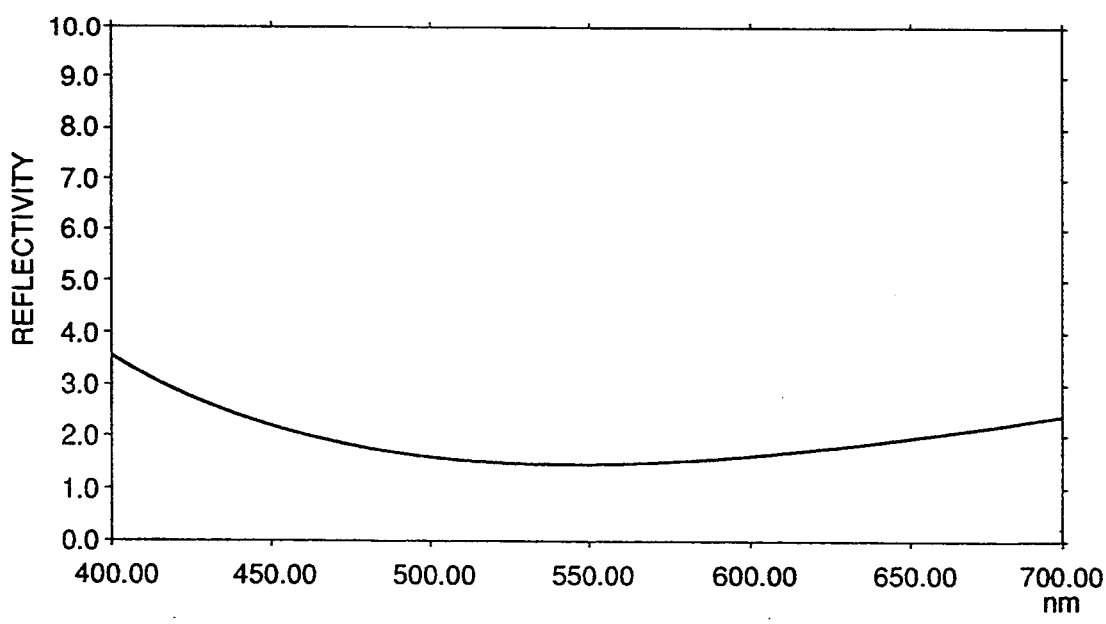
FIG. 4 is a graph indicating the reflectivity of the optical device of the Comparative Example.

An optical device was formed in substantially the same manner as in Example 1, except for skipping the formation of the layer of polystyrene. More specifically, after a glass plate was treated with a silane coupling agent in substantially the same manner as in Example 1, a fluorocarbon was immediately formed thereon in substantially the same manner as in Example 1. The reflectivity characteristic of this optical device is shown in FIG. 4. As indicated in the figure, the optical device exhibited reflectivities as high as about 1.5–3.6% in a visible region of 400–700 nm.

EXAMPLE 2

A thoroughly IPA-washed acrylic resin lens (polymethylmethacrylate, nd=1.492, a diameter of 27 mm, an effective diameter of 23 mm, a convex curvature radius of 60.24, a concave curvature radius of 37.67) was dipped in an isobutyl acetate solution containing 3 wt. % polystyrene (STYRON ® G8259) for 20 seconds and then drawn up from the solution at a rate of 90 mm/min, followed by drying it at 60° C. for 20 minutes. Thus, first layers were formed, each having 166 nm and a K value of 1. The lens having the first layers was subject to a 10-minute plasma treatment performed under the following conditions: an output of 250 w, an oxygen flow of 500 sccm, and 1 Torr. Subsequently, the plate was dipped for 2 minutes in a octadecafluorooctane solution containing 2 wt. % fluorocarbon resin (nd=1.338, CYTOP-CTX ®) having the following repetition units:

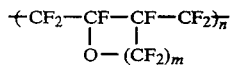

(n, m are positive integers.)

and then drawn up from the solution at a rate of 80 mm/min, followed by drying it at 60° C. for 2 hours. Thus, second layers were formed, each having a thickness of 99 nm and an L value of 1.

The thus-formed optical device composed of the acrylic resin lens and reflection preventing films formed thereon exhibited the following spectroscopic characteristics: reflectivity of 1.3% or lower, and transmittance of 98% or higher, in a visible region of 400–700 nm.

EXAMPLE 3

A thoroughly washed glass plate (BK7, nd=1.517, 76×24×1 mm) was subject to a UV-ozone treatment. Each of the two side surfaces of the glass base plate was irradiated with ultraviolet light (three 25-w lamps), and then treated for 3 minutes with ozone formed thereby (the ozone concentration reached 230 ppm three minutes after initiation of the UV irradiation and then leveled off). The thus-treated glass base plate was dipped for 2 minutes in a coating liquid consisting of: 3 wt. % ZrO2 having average particle sizes of 15±1 nm; 9.6 wt. % tetraethoxysilane; 1 wt. % silicon-type surface active agent; 1 wt. % water; 0.4 wt. % hydrochloride; 25 wt. % ethyl acetate; 60 wt. % ethanol. Subsequently, the glass base plate was drawn up from the liquid at a rate of 240 mm and then dried at 120° C. for 30 minutes, followed by further drying it at 250° C. for 60 minutes. Thus, first layers were formed, each having a thickness of 160 nm and a k value of 1. The refractive index of this layer was nd=1.66, according to a measurement. The glass base plate having the first layers was subject to the UV-ozone treatment in substantially the same manner as described above (each side surface was treated for three minutes). Subsequently, the plate was dipped for 2 minutes in an octadecafluorooctane solution containing 3 wt. % fluorocarbon resin (nd=1.31, TEFLON ®, Du Pont) having the following repetition units:

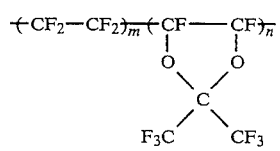

(n, m are positive integers)

and then drawn up from the solution at a rate of 60 mm/min, followed by drying it at 180° C. for 60 minutes. Thus, second layers were formed, each having a thickness of 99 nm and an L value of 1.

Figure 5:
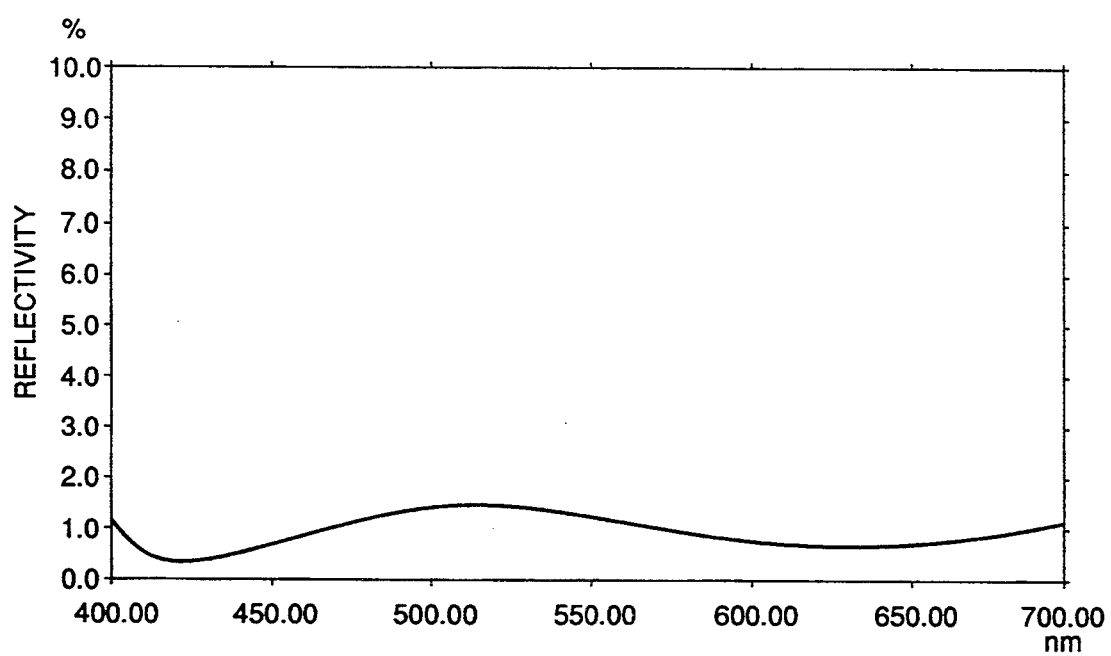
FIG. 5 is a graph indicating the reflectivity of the optical device of Example 3 of the present invention.

The thus-formed optical device composed of the glass base plate and reflection preventing films formed thereon exhibited the following spectroscopic characteristics: reflectivity of 1.5% or lower, and transmittance of 98% or higher, in a visible region of 400–700 nm. The result of this spectroscopic analysis is shown in FIG. 5.

EXAMPLE 4

A thoroughly washed quartz base plate (nd=1.458, 76×24×1 mm) was dipped in an ethanol solution containing 1 wt. % N-β(aminoethyl)γ-aminopropyltriethoxysilane for 30 minutes and then drawn up from the solution at a rate of 60 m/min. After drying at 80° C. for 30 minutes, the quartz base plate was washed with ethanol and then dried, followed by a surface treatment with a silane coupling agent. The quartz base plate treated with the silane coupling agent was dipped in a toluene solution containing 3 wt. % polystyrene (nd=1.583, PanLite ® AD5503, TEIJIN CHEMICALS LTD.) for 2 minutes and then drawn up from the solution at a rate of 70 mm/min, followed by drying it at 150° C. for 30 minutes. Thus, first layers were formed, each having a thickness of 123 nm and a K value of 1. The base plate having the first layer was dipped in a 1 wt. % γ-aminopropyltriethoxysilane ethanol-solution for 30 minutes and then drawn up from the solution at a rate of 60 mm/min, followed by drying it at 80° C. for 30 minutes and washing it with ethanol. Subsequently, the plate was dipped for 2 minutes in an octadecafluorooctane solution containing 2 wt. % fluorocarbon resin (nd=1.338, CYTOP-CTX ®) having the following repetition units:

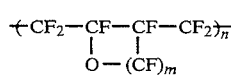

-continued (n, m are positive integers)

and then drawn up from the solution at a rate of 60 mm/min, followed by drying it at 150° C. for 60 minutes. Thus, second layers were formed, each having a thickness of 146 nm and an L value of 1.

Figure 6:
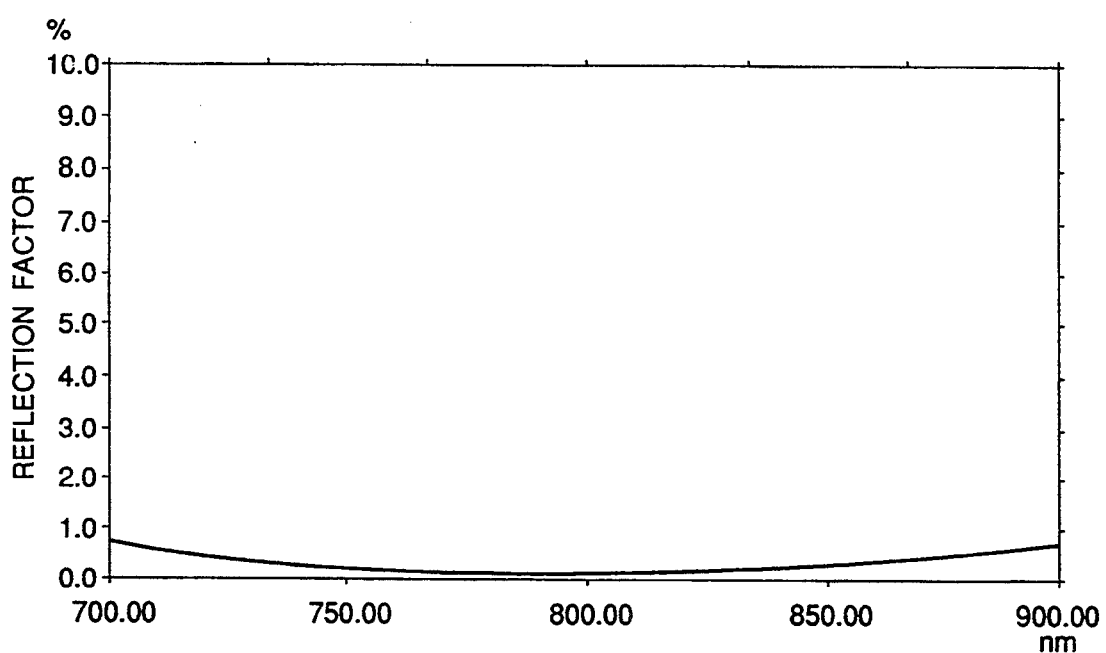
FIG. 6 is a graph indicating the reflectivity of the optical device of Example 4 of the present invention.

The thus-formed optical device composed of the quartz base plate and reflection preventing films formed thereon exhibited the following spectroscopic characteristics: reflectivity of 1 % or lower, and transmittance of 98% or higher, in a near infrared region of 700–900 nm. The result of this spectroscopic analysis is shown in FIG. 6.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. An optical device comprising: a transparent base plate; a first layer formed of a substance having a refractive index of 1.58 or higher; and a second layer which is farther from said transparent base plate than said first layer is from said transparent base plate and which is formed of an amorphous transparent fluorocarbon resin having a refractive index of 1.35 or lower, said first layer and said second layer constituting a film for preventing reflection.

2. An optical device according to claim 1, wherein said first layer and said second layer are formed by applying to said transparent base plate coating liquids obtained by dispersing or dissolving the respective materials of said first layer and said second layer in organic solvents.

3. An optical device according to claims 1 or 2, wherein said first layer has an optical thickness $n_1 d_1$ which satisfies a first inequality:

$$0.8 \times k\lambda_1/2 \leq n_1 d_1 \leq 1.2 \times k\lambda_1/2$$

and said second layer has an optical thickness $n_2 d_2$ which satisfies a second inequality:

$$0.8 \times L\lambda_2/4 \leq n_2 d_2 \leq 1.2 \times L\lambda_2/4$$

where k and L are positive odd numbers; $n_1$ and $n_2$ are the refractive indexes of said first layer and said second layer, respectively; $d_1$ and $d_2$ are the thickness of said first layer and said second layer, respectively; and $\lambda_1$ and $\lambda_2$ are the designed wavelengths of said first layer and said second layer, respectively, which are exactly or approximately the same and selected from a wavelength range of 400–900 nm.

4. An optical device according to claim 1 or 2, wherein said first layer contains fine particles of a metal oxide and a binding agent.

5. An optical device according to claim 4, wherein said metal oxide is selected from the group consisting of: titanium Ti, cerium Ce, zirconium Zr, tin Sn, antimony Sb, and tantalum Ta.

6. An optical device according to claims 1 or 2, wherein said first layer is formed of a macromolecular resin.

7. An optical device according to claim 6, wherein said macromolecular resin is selected from the group consisting of: polystyrene, polycarbonate, polystyrene derivatives, polycarbonate derivatives, and polymethylmethacrylate derivatives.

8. An optical device according to claims 1 or 2, wherein said first layer is formed by a method comprising the steps of:

providing an adhesive layer on said transparent base plate; and forming said first layer on said adhesive layer on said transparent base plate.

9. An optical device according to claims 1 or 2, wherein said first layer is formed by a method comprising the steps of:

performing ultra-violet ozone treatment on a surface of said transparent base plate; and forming said first layer on said ultra-violet ozone treated surface of said transparent base plate.

10. An optical device according to claims 1 or 2, wherein said first layer is formed by a method comprising the steps of:

performing a corona-discharge treatment on a surface of said transparent base plate; and forming said first layer on the corona-discharge treated surface of said transparent base plate.

11. An optical device according to claims 1 or 2, wherein said first layer is formed by a method comprising the steps of:

performing plasma treatment on a surface of said transparent base plate; and forming said first layer on the plasma treated surface of said transparent base plate.

12. An optical device according to claims 1 or 2, wherein said first layer is formed by a method comprising the steps of:

performing ultraviolet-ozone treatment on a surface of said transparent base plate;

forming an adhesive layer on the ultraviolet-ozone treated surface of said transparent base plate; and forming said first layer on said adhesive layer.

13. An optical device according to claims 1 or 2, wherein said first layer is formed by a method comprising the steps of:

performing corona-discharge treatment on a surface of said transparent base plate;

forming an on adhesive layer on the corona-discharge treated surface of said transparent base plate; and forming said first layer on said adhesive layer.

14. An optical device according to claims 1 or 2, wherein said first layer is formed by a method comprising the steps of:

performing a plasma treatment on a surface of said transparent base plate;

forming an adhesive layer on the plasma treated surface of said transparent base plate;

forming said first layer on said adhesive layer.

15. An optical device according to claims 1 and 2, wherein said second layer is formed by a method comprising the steps of:

providing an adhesive layer on said transparent base plate;

forming said first layer on said adhesive layer;

performing ultraviolet-ozone treatment on the surface of said first layer; and forming said second layer on the ultraviolet-ozone treated surface of said first layer.

16. An optical device according to claims 1 and 2, wherein said second layer is formed by a method comprising the steps of:
 providing an adhesive layer on said transparent base plate;
 forming said first layer on said adhesive layer;
 performing corona-discharge treatment on the surface of said first layer; and
 forming said second layer on the corona-discharge treated surface of said first layer.

17. An optical device according to claims 1 and 2, wherein said second layer is formed by a method comprising the steps of:
 providing an adhesive layer on said transparent base plate;
 forming said first layer on said adhesive layer;
 performing plasma treatment on the surface of said first layer;
 forming said second layer on the plasma-treated surface of said first layer.

18. An optical device according to claims 1 and 2, wherein said second layer is formed by a method comprising the steps of:
 providing an adhesive layer on said transparent base plate;
 forming said first layer on said adhesive layer; performing ultraviolet-ozone-treatment on the surface of said first layer;
 forming an adhesive layer on the ultraviolet-ozone treated surface of said first layer; and
 forming said second layer on said adhesive layer.

19. An optical device according to claims 1 and 2, wherein said second layer is formed by a method comprising the steps of:
 providing an adhesive layer on said transparent base plate;
 forming said first layer on said adhesive layer;
 performing corona-discharge treatment on the surface of said first layer;
 forming an adhesive layer on the corona-discharge treated surface of said first layer; and
 forming said second layer on said adhesive layer.

20. An optical device according to claims 1 and 2, wherein said second layer is formed by a method comprising the steps of:
 providing an adhesive layer on said transparent base plate;
 forming said first layer on said adhesive layer;
 performing plasma treatment on the surface of said first layer;
 forming an adhesive layer on the plasma-treated surface of said first layer; and
 forming said second layer on said adhesive layer.

* * * * *

UNITED STATES PATENT AND TRADEMARK OFFICE
CERTIFICATE OF CORRECTION

PATENT NO. : 5,392,156
DATED : February 21, 1995
INVENTOR(S) : Hiroaki Kumagai, et al It is certified that error appears in the above-indentified patent and that said Letters Patent is hereby corrected as shown below:

COLUMN 1

Line 22, "$MgF_2$;" should read --$MgF_2$,--.

COLUMN 2

Line 4, "surface" should read --surface of--;

Line 47, "or" should be deleted; and

Line 49, "$0.8 \times k\lambda_1/4 \leq n_1 d_1 \leq 1.2 \times k\lambda_1/4$" should be deleted.

COLUMN 3

Line 12, "3," should read --1--.

COLUMN 4

Line 34, "copolymers" should read --copolymer--.

UNITED STATES PATENT AND TRADEMARK OFFICE
CERTIFICATE OF CORRECTION

PATENT NO.  : 5,392,156
DATED       : February 21, 1995
INVENTOR(S) : Hiroaki Kumagai, et al It is certified that error appears in the above-indentified patent and that said Letters Patent is hereby corrected as shown below:

<u>COLUMN 12</u>

Line 1, "layer; per-" should read --layer; ¶ per- --.

Signed and Sealed this

Twenty-seventh Day of June, 1995

Attest:

BRUCE LEHMAN

Attesting Officer

Commissioner of Patents and Trademarks